(12) United States Patent
Kosugi et al.

(10) Patent No.: US 10,763,053 B2
(45) Date of Patent: Sep. 1, 2020

(54) SWITCH DEVICE

(71) Applicant: KABUSHIKI KAISHA TOKAI RIKA DENKI SEISAKUSHO, Aichi (JP)

(72) Inventors: Masanori Kosugi, Aichi (JP); Naofumi Kato, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 198 days.

(21) Appl. No.: 16/063,763

(22) PCT Filed: Jan. 12, 2017

(86) PCT No.: PCT/JP2017/000889
§ 371 (c)(1),
(2) Date: Jun. 19, 2018

(87) PCT Pub. No.: WO2017/122749
PCT Pub. Date: Jul. 20, 2017

(65) Prior Publication Data
US 2020/0105482 A1   Apr. 2, 2020

(30) Foreign Application Priority Data

Jan. 15, 2016   (JP) .................................. 2016-005751

(51) Int. Cl.
*H01H 3/12* (2006.01)
*B60R 11/02* (2006.01)
(Continued)

(52) U.S. Cl.
CPC ........... *H01H 3/12* (2013.01); *B60R 11/0264* (2013.01); *H01H 13/14* (2013.01); *H01H 13/52* (2013.01); *B60R 2011/0021* (2013.01)

(58) Field of Classification Search
CPC .......... H01H 3/12; H01H 13/52; H01H 13/14; B60R 11/0264; B60R 2011/0021
See application file for complete search history.

(56) References Cited

U.S. PATENT DOCUMENTS 5,876,243 A      3/1999   Sangawa
7,851,719 B2 *  12/2010   Dzioba ................ B60N 2/0228
                                                        200/512
(Continued)

FOREIGN PATENT DOCUMENTS

DE   102014018458 B3   12/2015
JP         09-204842 A    8/1997
(Continued)

OTHER PUBLICATIONS

International Search Report issued in a corresponding application No. PCT/JP2017/000889 dated Apr. 11, 2017.
(Continued)

*Primary Examiner* — Edwin A. Leon
*Assistant Examiner* — Lheiren Mae A Caroc
(74) *Attorney, Agent, or Firm* — Robert Calderon Safran & Cole P.C.

(57) ABSTRACT

A switch device includes an operation switch including a switch knob formed integrally with a recess configured to allow a finger to be inserted. The operation switch includes a detector configured to detect a change in a physical amount caused by operation of the switch knob.

8 Claims, 9 Drawing Sheets

(51) Int. Cl.
　　　*H01H 13/14*　　(2006.01)
　　　*H01H 13/52*　　(2006.01)
　　　*B60R 11/00*　　(2006.01)

(56)　　　　References Cited

U.S. PATENT DOCUMENTS

| | | | |
|---|---|---|---|
| 2010/0276264 A1* | 11/2010 | Boeckstiegel | B60Q 5/003 |
| | | | 200/61.55 |
| 2013/0187889 A1 | 7/2013 | Pandher et al. | |
| 2016/0156353 A1* | 6/2016 | Tachiiri | H03K 17/975 |
| | | | 200/600 |

FOREIGN PATENT DOCUMENTS

| | | |
|---|---|---|
| JP | 2013-212819 A | 10/2013 |
| WO | 2013/112504 1 A | 8/2013 |

OTHER PUBLICATIONS

International Preliminary Report on Patentability and Written Opinion issued in International Application No. PCT/JP2017/000889 dated Jul. 26, 2018.

\* cited by examiner

SWITCH DEVICE

CROSS-REFERENCE TO RELATED APPLICATIONS

The present application is a U.S. National Phase of PCT/JP2017/000889 filed on Jan. 12, 2017 claiming priority to Japanese Patent Application No. 2016-005751 filed on Jan. 15, 2016. The disclosure of the PCT Application is hereby incorporated by reference into the present Application.

TECHNICAL FIELD

The present invention relates to a switch device and particularly relates to a switch device preferably used for a power window device or the like configured to raise and lower a window glass of a vehicle.

BACKGROUND ART

As an example of a vehicle switch device, a switch including a connector has been proposed that raises and lowers a window glass of an automobile (for example, see Patent Document 1).

The switch including a connector described in Patent Document 1 includes vertically pivotable key switch knobs attached to an elongated box at an upper portion of the elongated box, a contact attached to an inner portion of the box, and a connector attached to a side portion of the box. Each pair of key switch knobs are arranged in two rows in a front-back direction of the box.

The box includes a recess and a partition wall provided at an upper portion of the box in a front-back direction. The recess is configured to allow a fingertip of an operator to be inserted and disposed frontward from a leading end of each of the key switch knobs, and the partition wall separates the key switch knobs arranged in one row. This configuration allows a pulling-up operation or a pushing-down operation of the switch knobs using the recess of the box.

CITATION LIST

Patent Literature

Patent Document 1: JP 09-204842 A

SUMMARY OF INVENTION

Technical Problem

In the switch including a connector described in Patent Document 1, a box needs to be manufactured whose length is the sum of a length in a front-back direction of the recess configured to allow a fingertip of an operator to be inserted under a back surface of the key switch knob and a length in a front-back direction of the partition wall separating the key switch knobs arranged in one row. This configuration needs a space in which the recess and the partition wall are disposed, which makes it difficult to reduce the total length in the front-back direction of the box to miniaturize the entire switch.

An object of the invention is to provide a switch device that can achieve reduced total length in a front-back direction and miniaturization.

Solution to Problem

A switch device according to an embodiment of the invention includes an operation switch including a switch knob formed integrally with a recess configured to allow a finger to be inserted. The operation switch includes a detector configured to detect a change in a physical amount caused by operation of the switch knob.

The detector may include a touch sensor configured to detect contact between the switch knob and a finger.

The detector may include a strain sensor configured to detect an amount of strain caused by a pulling-up force and a pushing-down force on the switch knob.

The detector may include a touch sensor configured to detect contact between the switch knob and a finger and a strain sensor configured to detect strain caused by a pulling-up force and a pushing-down force on the switch knob.

The operation switch may be configured to be movable in a pulling-up direction and a pushing-down direction of the switch knob with respect to an attachment target to which the operation switch is attached. The detector includes a touch sensor configured to detect contact between the switch knob and a finger and a movement direction detection sensor configured to detect a movement direction with respect to the attachment target.

The operation switch may include a plurality of switch knobs. The plurality of switch knobs are formed integrally with each other at required intervals.

The operation switch may include an operation switch attached in a vehicle cabin of a vehicle.

The operation switch may include an operation switch attached to a door on a vehicle cabin side of a vehicle.

The switch knob may be integrated with a body of the operation switch and may not include a moving part.

Advantageous Effects of Invention

According to an embodiment of the invention, a switch device can be provided that can achieve reduced total length in a front-back direction and miniaturization.

DESCRIPTION OF EMBODIMENTS

Preferred embodiments of the invention will be described in detail hereinafter with reference to the appended drawings.

First Embodiment

Overall Configuration of Driver Side Door of Vehicle

Figure 1:
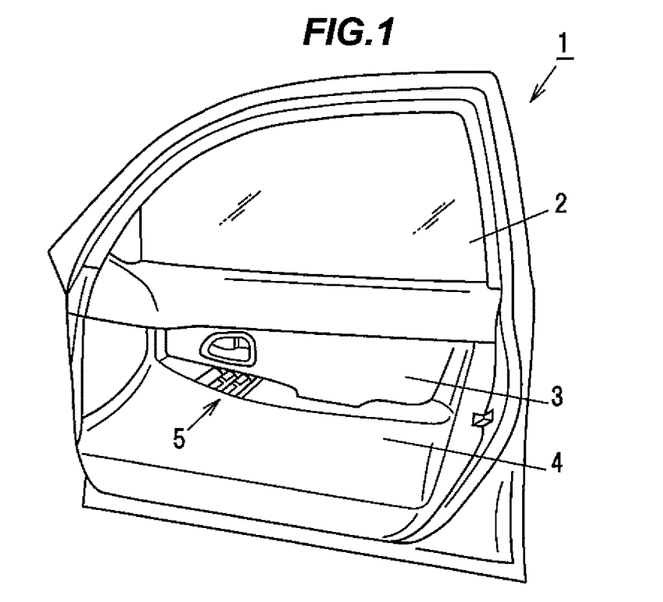
FIG. 1 is an explanatory diagram illustrating an example of a driver side door of a vehicle provided with a switch device according to a preferable first embodiment of the invention.

FIG. 1 is a diagram schematically illustrating an example of a driver side door of a vehicle. The driver side door is indicated as a whole by reference numeral 1. The driver side door 1 includes a window glass 2 mounted therein, and the window glass 2 can be raised and lowered. A door armrest 4 bulging toward the vehicle cabin is attached to a door trim 3 of the driver side door 1, and a switch device 5 according to the first embodiment is mounted within an upper surface of the door armrest 4.

Figure 2:
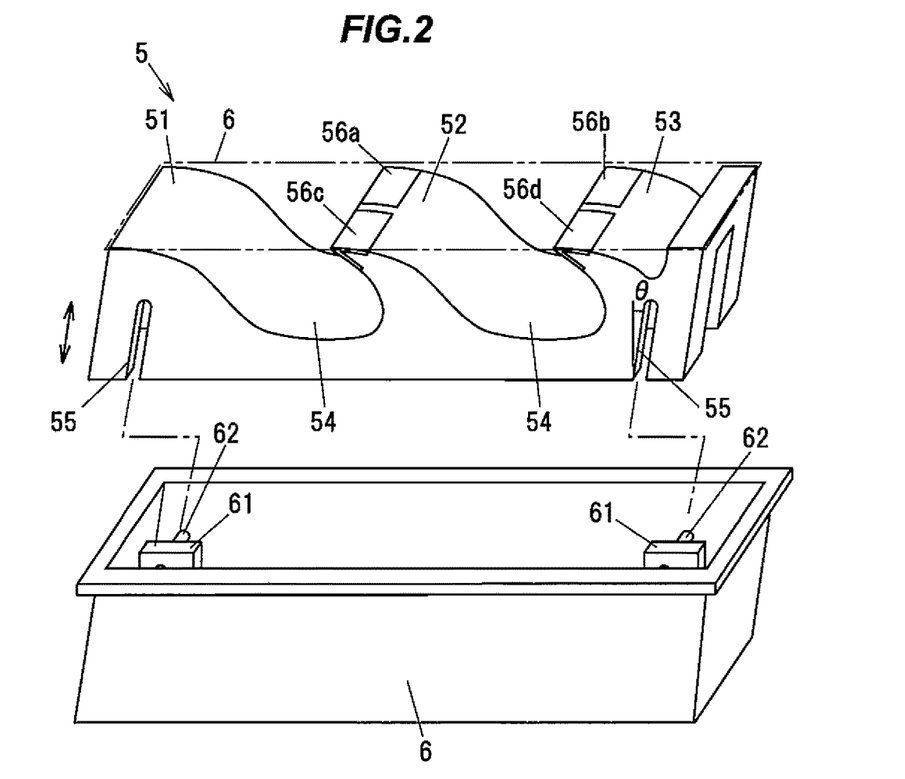
FIG. 2 is a perspective view schematically illustrating an example of a switch device according to the first embodiment.

As illustrated in FIG. 2, the switch device 5 includes an operation switch 51 for a raising and lowering operation of the window glass 2 and a switch case 6 that houses and supports the operation switch 51 movably in a vehicle up and down direction. The operation switch 51 includes a front switch knob 52 for a raising and lowering operation of the window glass 2 of the driver side door 1 and a window glass of a front passenger side door, and a rear switch knob 53 for a raising and lowering operation of a window glass of a right rear side door and a window glass of a left rear side door.

The switch device 5 is a power window switch having a function including a raising operation, an automatic raising operation, a lowering operation, and an automatic lowering operation of a window glass. The front switch knob 52 and the rear switch knob 53 (hereinafter, also simply referred to as "switch knobs 52, 53") are formed integrally with and continuously to recesses 54 configured to allow a finger to be inserted, while corresponding to the window glass 2 of the driver side door 1, and the respective window glasses of the right rear side door, the front passenger side door, and the left rear side door. Note that the front switch knob 52 and the rear switch knob 53 have substantially the same shape and configuration.

Configuration of Switch Device

In a case of an operation in which window glasses are operated at the driver seat of a vehicle, the following operations are typically performed; an operation in which right and left window glasses are simultaneously opened and closed, an operation in which while a left window glass is opened, a right window glass is closed, an operation in which front and rear window glasses are simultaneously opened or closed in the same direction, and an operation in which all the front-back and right-left window glasses are simultaneously opened or closed in the same direction. This indicates that the switch device 5 according to the first embodiment is based on a technical concept in which the front-back and right-left window glasses need not be independently raised and lowered.

The operation switch 51 in such a switch device 5 has a primary configuration in which the operation switch 51 includes an operation switch made of synthetic resin and including the switch knobs 52, 53 formed integrally with and continuously to each other, the switch knobs 52, 53 each including the curved recess 54 serving as an operation space for performing a pulling-up operation or a pushing-down operation with a fingertip of an operator.

The operation switch 51 includes a shell elongated in the front-back direction. The shell includes a pair of side walls formed on the right and left side of a pair of vehicle front-back switch knobs 52, 53 and an opened bottom. The switch knobs 52, 53 each gradually taper as it extends from the bottom of the recess 54 toward the leading end portion on a vehicle front side, and the taper-shaped leading end portion can be curved in a vehicle up-down direction.

The corresponding switch case 6 is mounted within an upper surface of the door armrest 4. The switch case 6 includes a plate-shaped wall 61 erecting on the bottom surface of a recess of the switch case 6, an intermediate portion of the plate-shaped wall 61 being cut out. The wall 61 is penetrated with a pair of attachment shaft portions 62, 62 disposed in the vehicle front-back direction. Both the right and left ends of each of the attachment shaft portions 62, 62 are fixed to right and left side walls of the switch case 6.

Slit-shaped guide holes 55, 55 are formed in and penetrate through right and left side walls of the operation switch 51 on each front and rear side of the side walls. The guide holes 55, 55 extend upwardly, inclining in a vehicle rear direction at a required inclination angle $\theta$. The attachment shaft portion 62 of the switch case 6 slidably supports the guide holes 55 of the operation switch 51. Note that the guide holes 55, 55 formed in the right wall of the operation switch 51 on the front and rear sides of the right wall are not illustrated in FIG. 2.

The guide hole 55 of the operation switch 51 and the attachment shaft portion 62 of the switch case 6 are configured as a slide structure that allows the operation switch 51 to move in the vehicle up-down direction at the required inclination angle $\theta$. The slide structure allows a slide switch 7 to be slid to be provided in the operation switch 51.

Figure 3:
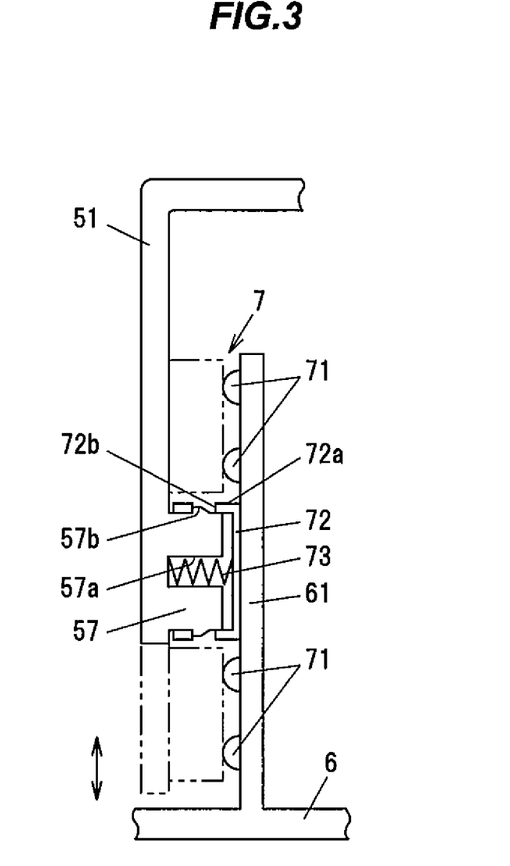
FIG. 3 is a cross-sectional view of a main portion schematically illustrating an example of a slide switch applicable to a switch device according to the first embodiment.

As illustrated in FIG. 3, the slide switch 7 has a configuration in which a moving contact plate 72 is provided on an inner surface of the left wall of the operation switch 51 and serves as a moving contact, and the moving contact plate 72 is configured to switch the connection between a plurality of hemispherical fixed contacts 71. The fixed contacts 71 include two pairs of fixed contacts disposed vertically with a neutral position of the operation switch 51 as a boundary. The fixed contacts 71 are electrically connected to an electrically conductive pattern of a board provided on the wall 61 of the switch case 6.

The corresponding moving contact plate 72 includes a pair of bent pieces 72a, 72a formed by bending the both ends of a plate in a C shape. The operation switch 51 includes a contact holder 57 formed integrally with the operation switch 51 on the inner surface of the shell of the operation switch 51, the contact holder 57 including a recess 57a that houses a compression coil spring 73. Engaging holes 72b, 72b formed in the pair of bent pieces 72a, 72a of the moving contact plate 72 are movably engaged with and secured to engaging projection portions 57b projected outwardly from the contact holder 57 via the compression coil spring 73.

The moving contact plate 72 is configured such that elasticity of the compression coil spring 73 constantly acts on the fixed contacts 71. The operation switch 51 vertically moves while sliding on the fixed contacts 71 against the spring of the compression coil spring 73, which allows electrical contact between the moving contact plate 72 and the fixed contacts 71.

The operation switch 51 is configured such that in a case that the operation switch 51 is vertically moved, the first-level fixed contact 71 of each pair of fixed contacts 71 and the moving contact plate 72 are electrically connected to cause a raising and lowering movement of the window glass 2. Then, the moving contact plate 72 straddles the first-level fixed contact 71 and the second-level fixed contact 71, which allows electrical connection between them to cause an automatic raising and lowering movement of the window glass 2.

Note that the switch device 5 is preferably configured as a momentary switch in which in a case that a pulling-up operation or a pushing-down operation of the front switch knob 52 with a fingertip of an operator is released or a pulling-up operation or a pushing-down operation of the rear switch knob 53 is released, the front switch knob 52 or the rear switch knob 53 is automatically returned at the neutral position thereof. The slide switch 7 may be provided between an outer surface of the shell of the operation switch 51 and an inner surface of the switch case 6.

Configuration of Switch Knob

In the operation switch 51 in the illustrated example, the pair of vehicle front-back switch knobs 52, 53 cooperate mutually to simultaneously move in the same direction. In this configuration, it is important to detect positional information indicating which switch knob of the switch knobs 52, 53 is operated, and which position of the operated switch knob is operated.

Thus, a pair of vehicle right-left touch sensors 56a, 56c are provided in parallel at the leading end portion of the front switch knob 52 and each extend from the front surface of the leading end portion to the back surface. A pair of vehicle right-left touch sensors 56b, 56d are provided in parallel at the leading end portion of the rear switch knob 53 and each extend from the front surface of the leading end portion to the back surface. Each touch sensor serves as a detector configured to detect a change in a physical amount. In the illustrated example, the touch sensor 56a corresponds to the window glass 2 of the driver side door 1, the touch sensor 56c corresponds to the window glass of the front passenger side door, the touch sensor 56b corresponds to the window glass of the right rear side door, and the touch sensor 56d corresponds to the window glass of the left rear side door.

The touch sensors 56a, 56b, 56c, 56d can detect positional information indicating which switch knob of the switch knobs 52, 53 a finger of an operator is touching and which position of the touched switch knob the finger of the operator is touching. Various touch sensors such as an electrostatic capacitance touch sensor, a resistive film touch sensor, and a pressure sensitive touch sensor can be used as the touch sensors 56a, 56b, 56c, 56d.

It is important for the touch sensors 56a, 56b, 56c, 56d to detect, in addition to positional information indicating which switch knob of the switch knobs 52, 53 is operated and which position of the operated switch knob is operated, operation information indicating which switch knob of the switch knobs 52, 53 is used for a pulling-up operation or a pushing-down operation.

Thus, the slide switch 7 to be slid via the slide structure in which the operation switch 51 is moved in the vehicle up-down direction at the required inclination angle $\theta$ is configured as a movement direction detection sensor configured to detect a movement (sliding) direction of the operation switch 51. Since the operation switch 51 moves in the vehicle up-down direction at the required inclination angle $\theta$, a configuration can be used in which the movement direction of the operation switch 51 is detected on the basis of information on a position where the moving contact plate 72 comes in contact with the fixed contact 71.

The movement direction detection sensor is not limited to a sensor in the illustrated example. A magnetometric sensor or the like can also detect the movement direction of the operation switch 51, for example. Detecting the movement direction of the operation switch 51 to the switch case 6 allows operation information indicating which operation of a pulling-up operation or a pushing-down operation is performed with a fingertip of an operator to be detected.

Configuration of Window Control Device

Figure 4:
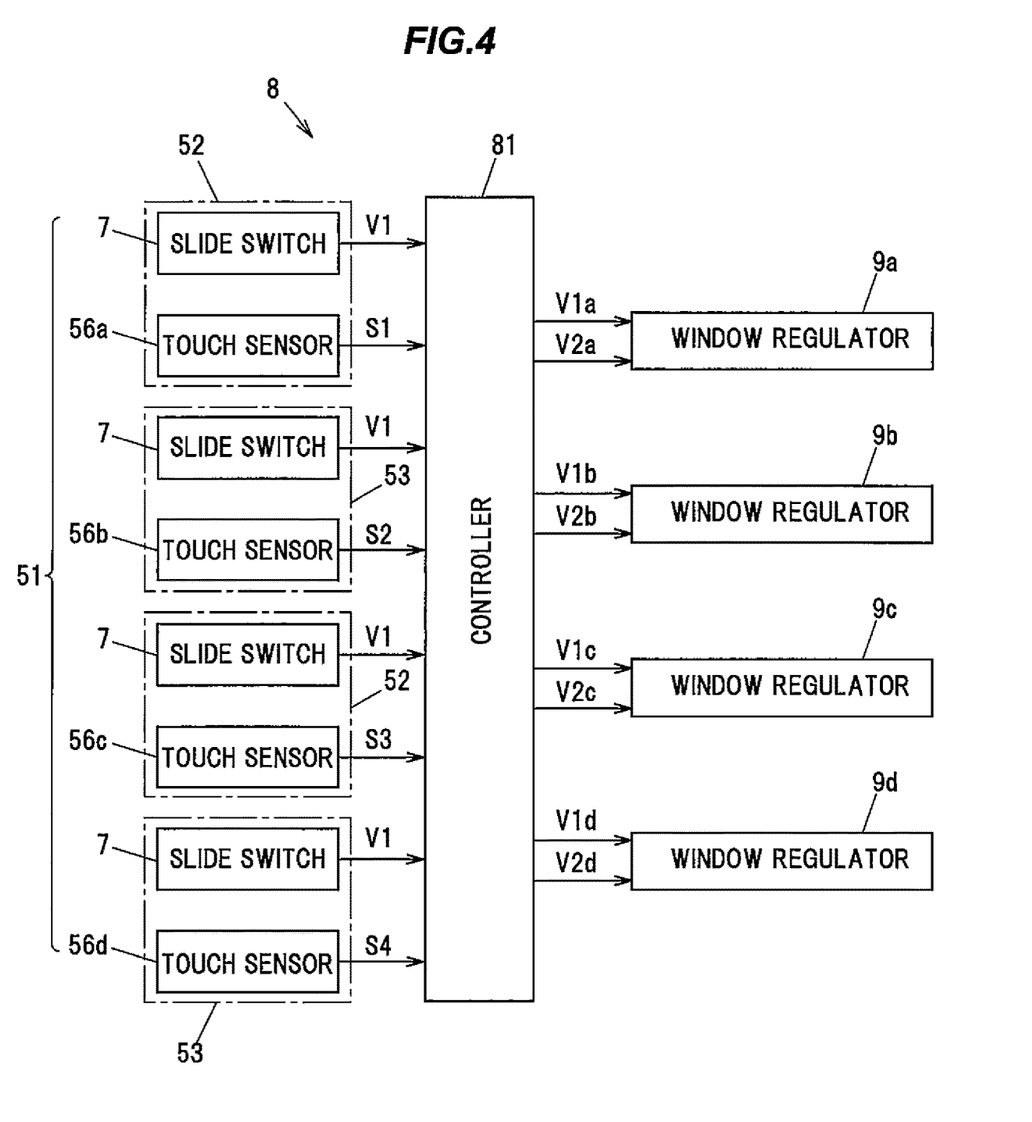
FIG. 4 is a function block diagram illustrating an example of a window control device of a switch device according to the first embodiment.

Here, in FIG. 4, an example of a window control device 8 configured to open and close the window glass 2 by operating the operation switch 51 is illustrated. The window control device 8 is configured such that the following five systems of output signals are output to a controller 81; output signals V1 including a raising signal, an automatic raising signal, a lowering signal, and an automatic lowering signal that are output from the slide switch 7, output signals S1, S3 that are output from the touch sensors 56a, 56c of the front switch knob 52, respectively, and output signals S2, S4 that are output from the touch sensors 56b, 56d of the rear switch knob 53, respectively. Note that FIG. 4 is a diagram illustrating the switch knobs 52, 53 for each functional block.

The controller 81 is a microcomputer including a CPU that carries out computations, processing, and the like on acquired data in accordance with a control program, a ROM, a RAM, and the like. The ROM stores various setting data for determining a state that the movement direction and connection state of the slide switch 7 and detection amounts from the touch sensors 56a, 56b, 56c, 56d of the front switch knob 52 and the rear switch knob 53 are associated with a contact position on the front switch knob 52 or the rear switch knob 53, an operation direction to the front switch knob 52 or the rear switch knob 53, and the like. Meanwhile, the RAM temporarily stores setting data read out from the ROM.

The controller 81 refers to a table stored in the storage unit in which the movement direction and connection state of the slide switch 7, the operation position on the front switch knob 52 or the rear switch knob 53 and the operation direction to the front switch knob 52 or the rear switch knob 53, the detection amounts from the touch sensors 56a, 56b, 56c, 56d, and the like, are combined and associated with each other, recognizes an operation state of the operation switch 51 on the basis of the acquired information, and generates raising drive signals V1a, V1b, V1c, V1d including a case of automatic raising and lowering drive signals V2a, V2b, V2c, V2d including a case of automatic lowering, these drive signals indicating the operation state.

The raising drive signals V1a, V1b, V1c, V1d including a case of automatic raising and the lowering drive signals V2a, V2b, V2c, V2d including a case of automatic lowering are output to drive motors of window regulators 9a, 9b, 9c, 9d each corresponding to the front switch knob 52 or the rear switch knob 53.

The switch knobs 52, 53 configured as described above cooperate mutually to simultaneously move in the same direction and the vehicle up-down direction, and thus a raising operation and a lowering operation cannot be simultaneously performed. However, in a case that a touch sensor of either one of the switch knob 52 or the switch knob 53 is operated, a raising and lowering operation of any one of four window glasses is possible. Meanwhile, in a case that the switch knobs 52, 53 are simultaneously operated, all the four window glasses can be simultaneously raised or lowered.

Another Configuration of Switch Knob

Figure 5:
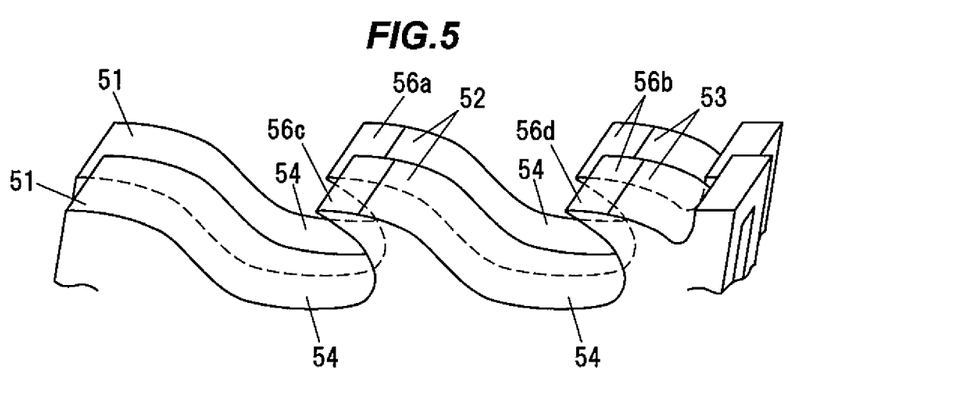
FIG. 5 is a partial perspective view schematically illustrating another example of a switch knob applicable to a switch device according to the first embodiment.

Referring to FIG. 5, another example of a switch knob applicable to the switch device 5 according to the first embodiment is schematically illustrated. Note that in FIG. 5, members that are substantially the same as those described in the first embodiment are referred to by the same names and indicated using the same reference signs.

For a raising and lowering operation of the four window glasses at the driver seat, the operation switch 51 is configured in two rows at required intervals on both sides in a vehicle right-left direction while corresponding to the window glass 2 of the driver side door 1 and the window glasses each provided in the front passenger side door, the right rear side door, and the left rear side door.

The operation switch 51 configured in two rows includes the switch knobs 52, 53 for the raising and lowering operation of the window glass 2 of the driver side door 1 and the window glass of the right rear side door and the switch knobs 52, 53 for the raising and lowering operation of the window glasses of the front passenger side door and the left rear side door. Note that one row of the operation switch 51 in the illustrated example has substantially the same shape and configuration as the other row. Note that the operation switch 51 illustrated on a forefront side in FIG. 5 exemplifies a state of a pulling-up operation.

In the illustrated example, the operation switch 51 is separated in two rows. However, the raising and lowering operation of the operation switch 51 may hardly cause the gap between the two rows, which can prevent dusts, rainwater, or the like from entering.

Effects of the First Embodiment

The switch device 5 configured as described above can provide the following effect in addition to the above described effects.

Figure 6A:
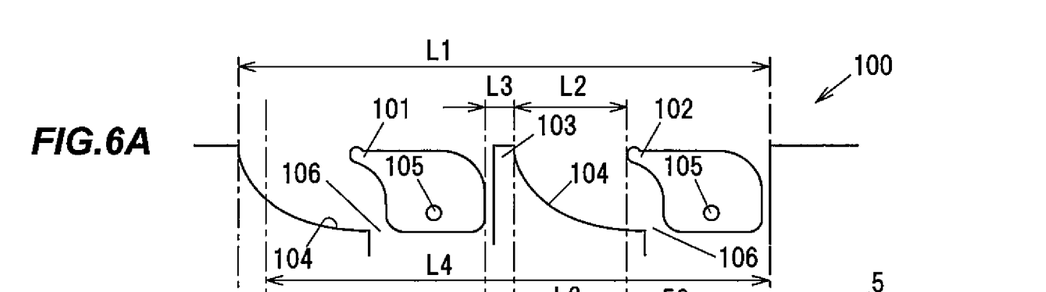
FIGS. 6A and 6B are explanatory diagrams for comparing a switch device in the related art with a switch device according to the first embodiment.
Figure 6B:
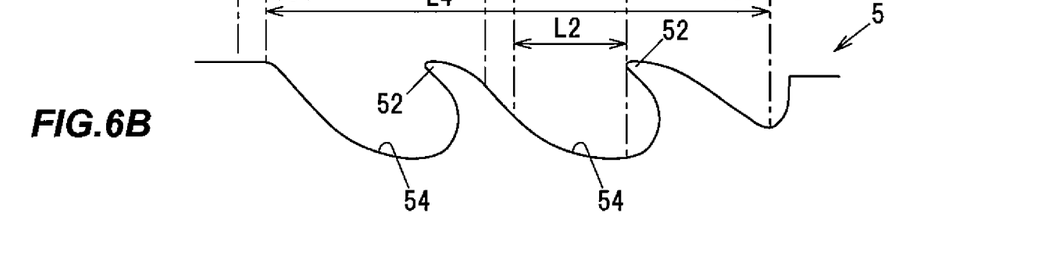

Here, in FIGS. 6A and 6B, a switch device 100 in the related art and the switch device 5 according to the first embodiment are compared.

As illustrated in FIG. 6A, the switch device 100 in the related art has a configuration in which, of switch knobs 101, 102 arranged in one row in the vehicle front-back direction, the switch knob 102 on a vehicle rear side includes a rotational shaft 105 disposed behind a partition wall 103 of the switch knob 101 on a vehicle front side and a recess 104 of a switch panel.

This configuration causes the total length L1 of a region where openings 106 serving as an arrangement space of the switch knobs 101, 102 arranged in one row, the partition wall 103 partitioning the switch knobs 101, 102, and the recesses 104 serving as an operation space of the switch knobs 101, 102 to increase, which enlarges a space occupied by the switch knobs 101, 102 arranged in one row.

In contrast, as illustrated in FIG. 6B, the switch device 5 according to the first embodiment has a configuration in which the recess 54 serving as an operation space of the switch knobs 52, 53 is also used as the partition wall of the switch knobs 52, 53.

Even in case where a length L2 of the recess 54 serving as an operation space of the switch knobs 52, 53 is the same as a length L2 of the recess 104 of the switch device 100 in the related art illustrated in FIG. 6A, this configuration allows a length L3 of an arrangement region which is the sum of lengths of the partition wall 103 and the opening 106 of the switch device 100 in the related art to decrease, which can set the total length L4 of an arrangement region of the switch knobs 52, 53 arranged in one row shorter than the total length L1 of an arrangement region of the switch device 100 in the related art.

Since a plurality of switch knobs 52, 53 arranged in one row are formed integrally with each other, no gap between the switch knobs 52, 53 is produced, which can prevent dusts, rainwater, or the like from entering.

A space occupied by the plurality of switch knobs 52, 53 arranged in one row can be reduced.

Since the space occupied by the plurality of switch knobs 52, 53 arranged in one row can be reduced, for example, in case in which an additional switch device for another application is disposed due to increased functionality of a vehicle, the miniaturization of the entire switch device 5 can be achieved.

The switch knobs 52, 53 are configured to include no rotation shaft part, which eliminates the possibility of a contact defect or a malfunction due to entered dusts, rainwater, or the like.

No gap between the switch knobs 52, 53 may be produced in a design surface of the operation switch 51, which can achieve the switch device 5 having excellent outward appearance design and high commercial value.

Second Embodiment

Referring to FIGS. 7, 8A to 8C, and 9, an example of a configuration of an operation switch 51 of a switch device 5 according to a second embodiment is schematically illustrated.

Figure 7:
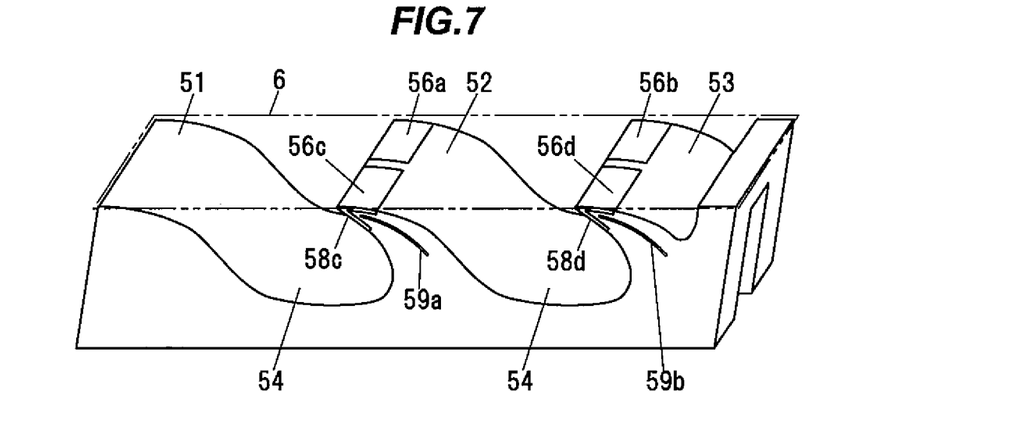
FIG. 7 is a perspective view schematically illustrating an example of a switch knob applicable to a switch device according to a second embodiment.

The operation switch 51 according to the second embodiment has substantially the same configuration as the operation switch 51 according to the first embodiment aside from the configuration of the switch knobs 52, 53. The same reference signs of members as those used in the first embodiment are used, and thus detailed descriptions thereof are omitted.

The second embodiment differs from the first embodiment in that the operation switch 51 is housed immovably to the switch case 6, and the front switch knob 52 and the rear switch knob 53 each have a function of detecting an opening and closing operation state of window glasses.

As illustrated in FIG. 7, the operation switch 51 includes a front switch knob 52 for a raising and lowering operation of the window glass 2 of the driver side door 1 and a window glass of a front passenger side door and a rear switch knob 53 for a raising and lowering operation of a window glass of a right rear side door and a window glass of a left rear side door. Note that two switch knobs 52, 53 have the same shape and configuration as each other.

With a leading end edge of the switch knob 52 as a boundary, upper touch sensors 56a, 56c disposed in parallel with each other and lower touch sensors 58a, 58c disposed in parallel with each other are provided on upper and lower surfaces of the leading edge portion of the switch knob 52, respectively, each touch sensor being configured to detect a physical amount and separated from each other. With a leading end edge of another switch knob 53 as a boundary, upper touch sensors 56b, 56d disposed in parallel with each other and lower touch sensors 58b, 58d disposed in parallel with each other are provided on upper and lower surfaces of the leading edge portion of the switch knob 53, respectively, these touch sensors being separated from each other.

Similar to the first embodiment, various touch sensors such as an electrostatic capacitance touch sensor, a resistive film touch sensor, and a pressure sensitive touch sensor can be used as the touch sensors 56a, 56b, 56c, 56d, 58a, 58b, 58c, 58d.

The operation switch 51 is configured to detect, in addition to positional information indicating which switch knob of the switch knobs 52, 53 a finger F of an operator is touching and which position of the touched switch knob the finger F of the operator is touching, operation information indicating which operation of a pulling-up operation or a pushing-down operation is performed, with the upper touch sensors 56a, 56b, 56c, 56d and the lower touch sensors 58a, 58b, 58c, 58d.

The switch knobs 52, 53 have, in addition to a function of detecting the positional information and the operation information, a function of detecting an opening and closing operation state of window glasses. In the illustrated example, strain sensors 59a, 59b, 59c, 59d are embedded in the switch knobs 52, 53 at the leading end of the switch knobs 52, 53 by insert molding. The strain sensor 59a is disposed corresponding to the upper touch sensor 56a, the strain sensor 59b is disposed corresponding to the upper touch sensor 56b, the strain sensor 59c is disposed corresponding to the upper touch sensor 56c, and the strain sensor 59d is disposed corresponding to the upper touch sensor 56d.

Various sensors that detect the amount of strain using a change in electrical resistance, a piezoelectric effect, or electrostatic capacitance are used as the strain sensors 59a, 59b, 59c, 59d serving as a detector configured to detect a change in a physical amount.

The strain sensors 59a, 59b, 59c, 59d detects the amounts of strain caused by pulling-up force or pushing-down force on the leading end portions of the switch knobs 52, 53 corresponding to the touch sensors 56a, 56b, 56c, 56d and the lower touch sensors 58a, 58b, 58c, 58d. Since the amount of strain experienced by the strain sensors 59a, 59b, 59c, 59d change depending on the strength of the pulling-up force or the pushing-down force, an operation state of the window glass 2, such as a raising operation, an automatic raising operation, a lowering operation, or an automatic lowering operation, is detected.

Figure 8A:
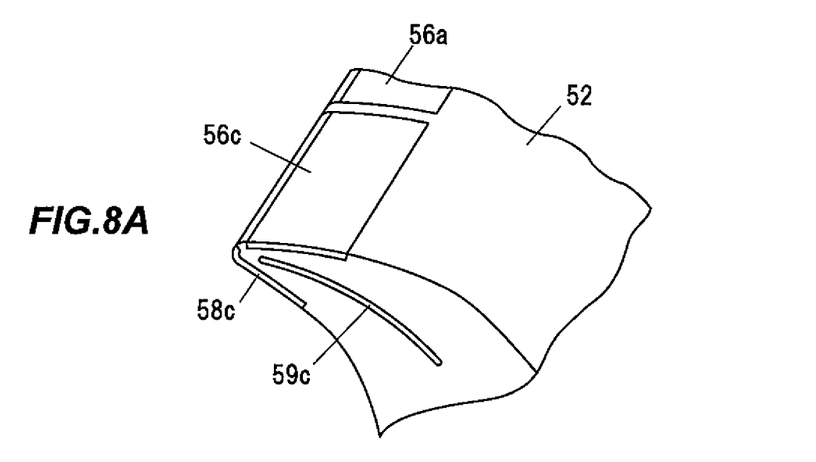
FIG. 8A is a perspective view of a main portion schematically illustrating the switch knob illustrated in FIG. 7.
Figure 8B:
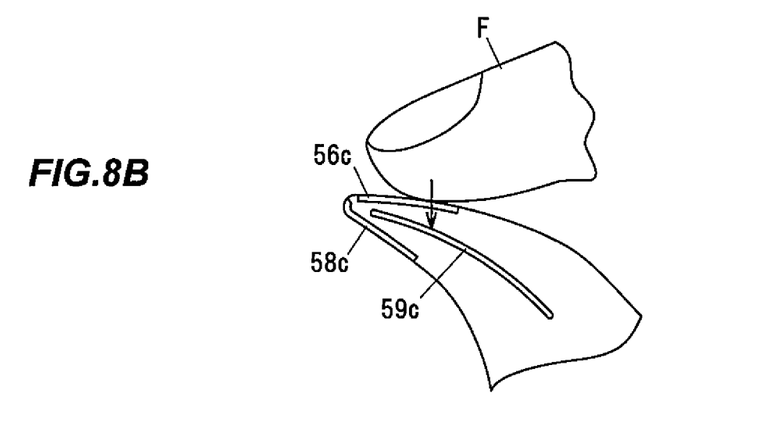
FIG. 8B is an explanatory diagram illustrating a pushing-down operation of a switch knob.
Figure 8C:
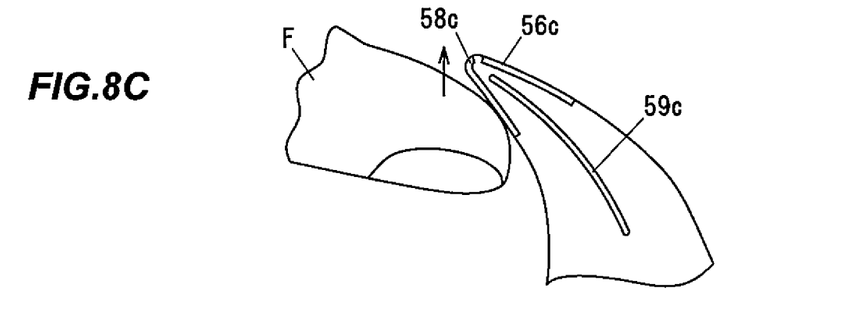
FIG. 8C is an explanatory diagram illustrating a pulling-up operation of a switch knob.

Here, referring to FIGS. 8A, 8B, and 8C, states of the pushing-down operation and the pulling-up operation of the switch knob 52 are exemplified. Note that each operation of the switch knob 53 can also be exemplified similar to the pushing-down operation and the pulling-up operation of the switch knob 52.

The switch knobs 52, 53 are configured such that the movement of the window glass 2 is changed between raising and lowering movement and automatic raising and lowering movement depending on the strength of the pulling-up force or the pushing-down force on the leading end portion of the switch knobs 52, 53. In such a case, the moderation feeling (click feeling) when operating the switch knobs 52, 53 is less likely to be obtained.

As an example of the measures, a configuration is possible in which a vibration presenter (not illustrated) is mounted in the operation switch 51. The operating surface of the switch knobs 52, 53 is vibrated using the vibration presenter to provide vibration. This vibration can generate moderation feeling in operation of the switch knobs 52, 53. For example, various actuators employing a piezoelectric element, a solenoid, an electromagnetic coil, or the like are used as the vibration presenter.

Figure 9:
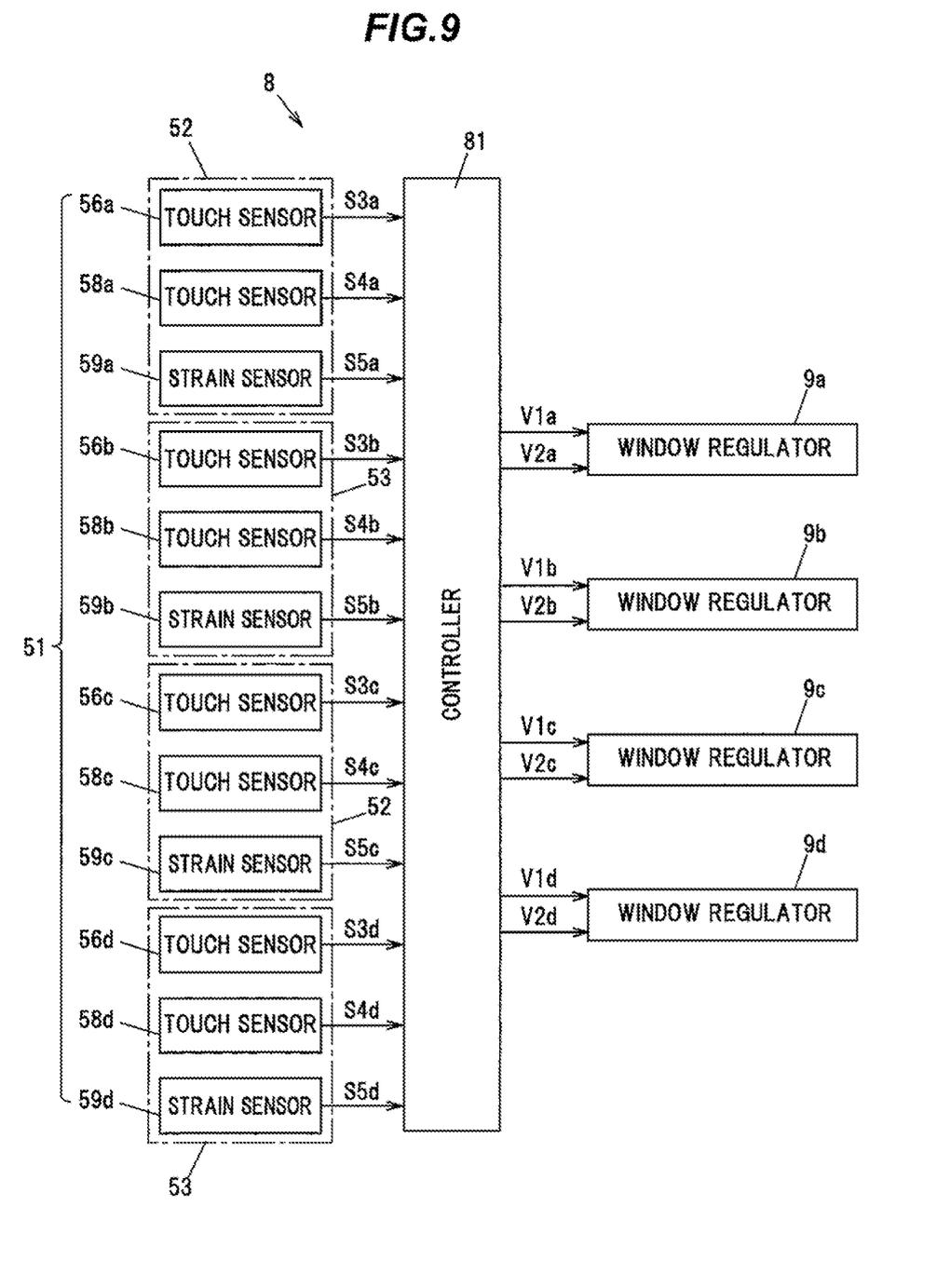
FIG. 9 is a function block diagram illustrating an example of a window control device of a switch device according to the second embodiment.

As illustrated in FIG. 9, the window control device 8 according to the second embodiment is configured such that the following twelve systems of output signals are output to the controller 81; output signals S3a, S3b, S3c, S3d that are output from the upper touch sensors 56a, 56b, 56c, 56d, respectively; output signals S4a, S4b, S4c, S4d that are output from the lower touch sensors 58a, 58b, 58c, 58d, respectively; and output signals S5a, S5b, S5c, S5d that are output from the strain sensors 59a, 59b, 59c, 59d, respectively.

The controller 81 refers to a table stored in the storage unit in which the detection amounts from the upper touch sensors 56a, 56b, 56c, 56d and the lower touch sensors 58a, 58b, 58c, 58d, the amounts of strain experienced by the strain sensors 59a, 59b, 59c, 59d, the operation position on the switch knobs 52, 53 and the operation direction to the switch knobs 52, 53, and the like, are combined and associated with each other, recognizes an operation state of the operation switch 51 on the basis of the acquired information, and generates raising drive signals V1a, V1b, V1c, V1d including a case of automatic raising, or lowering drive signals V2a, V2b, V2c, V2d including a case of automatic lowering, these drive signals indicating the operation state.

The raising drive signals V1a, V1b, V1c, V1d including a case of automatic raising and the lowering drive signals V2a, V2b, V2c, V2d including a case of automatic lowering are output to window regulators 9a, 9b, 9c, 9d each corresponding to either of the switch knobs 52, 53.

Effects of the Second Embodiment

The switch device 5 according to the second embodiment can provide the following effect in addition to the same effect as that of the first embodiment.

The functions of the upper touch sensors 56a, 56b, 56c, 56d, the lower touch sensors 58a, 58b, 58c, 58d, and the strain sensors 59a, 59b, 59c, 59d allow the raising and lowering operation of the window glasses corresponding to each of the pair of vehicle front-back switch knobs 52, 53 to be separately controlled without using the slide switch 7 according to the first embodiment. This configuration allows additional miniaturization of the entire switch device 5.

Third Embodiment

Referring to FIGS. 10 and 11A to 11C, an example of a configuration of an operation switch 51 of a switch device 5 according to the third embodiment is schematically illustrated.

Figure 10:
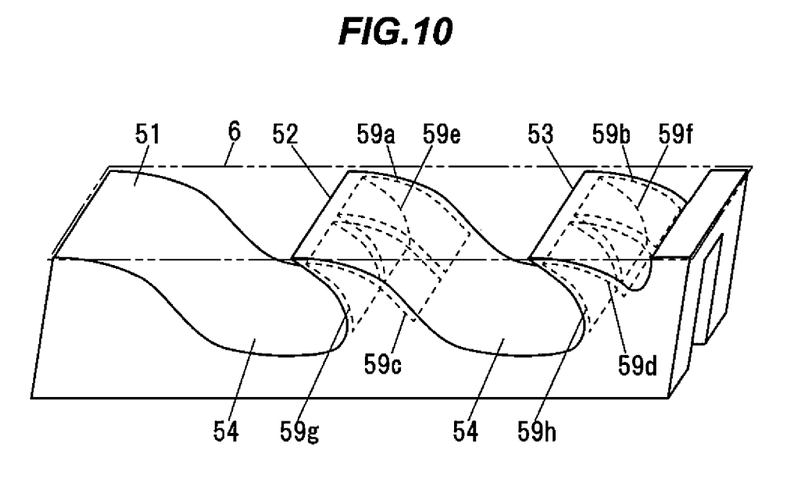
FIG. 10 is a perspective view schematically illustrating an example of a switch knob applicable to a switch device according to a third embodiment.

The operation switch 51 according to the third embodiment has substantially the same configuration as that of the operation switch 51 according to the second embodiment aside from the configuration of the switch knobs 52, 53. The same reference signs of members as those used in the second embodiment are used, and thus detailed descriptions thereof are omitted.

The third embodiment differs from each of the other embodiments described above in that the touch sensor is not used and only the strain sensor is provided in each of the switch knobs 52, 53 of the operation switch 51.

Figure 11A:
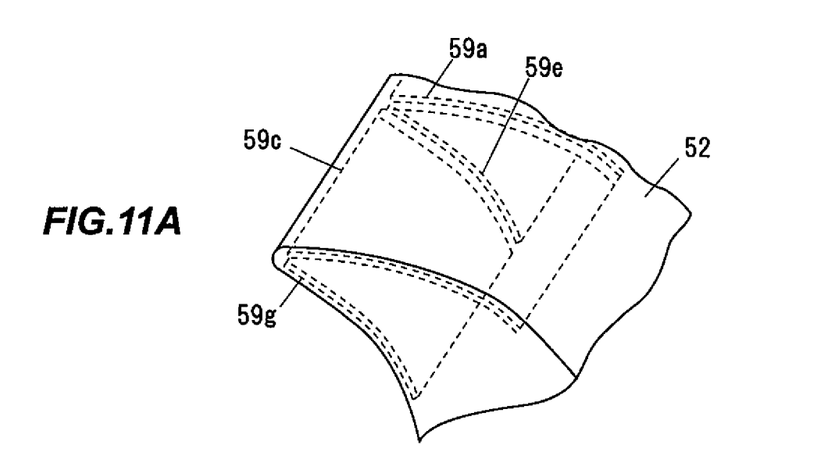
FIG. 11A is a perspective view of a main portion schematically illustrating the switch knob illustrated in FIG. 10.

As illustrated in FIGS. 10 and 11A, an upper right strain sensor 59a, an upper left strain sensor 59c, a lower right strain sensor 59e, and a lower left strain sensor 59g are embedded within the leading end portion of the front switch knob 52 by insert molding. An upper right strain sensor 59b, an upper left strain sensor 59d, a lower right strain sensor 59f, and a lower left strain sensor 59h are embedded within the leading end portion of another rear switch knob 53 by insert molding.

Figure 11B:
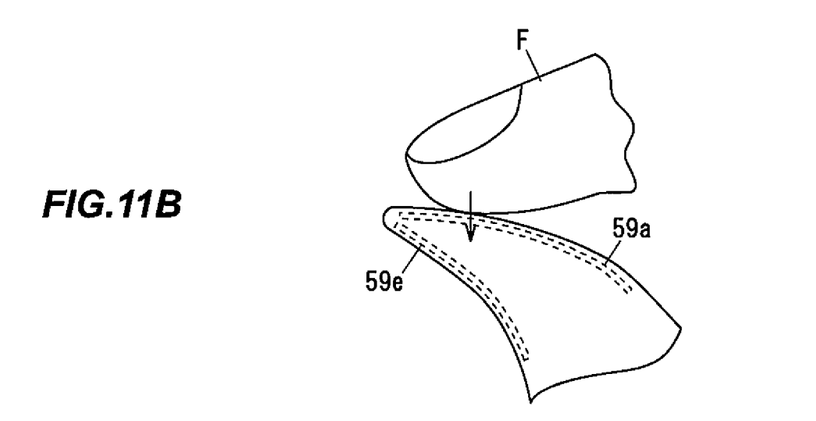
FIG. 11B is an explanatory diagram illustrating a pushing-down operation of a switch knob.

As illustrated in FIG. 11B, in a case of the pushing-down operation at a right region of the front switch knob 52, while the upper right strain sensor 59a is greatly curved and deformed, an amount of strain experienced by the lower right stain sensor 59e is less than an amount of strain experienced by the upper right strain sensor 59a.

Figure 11C:
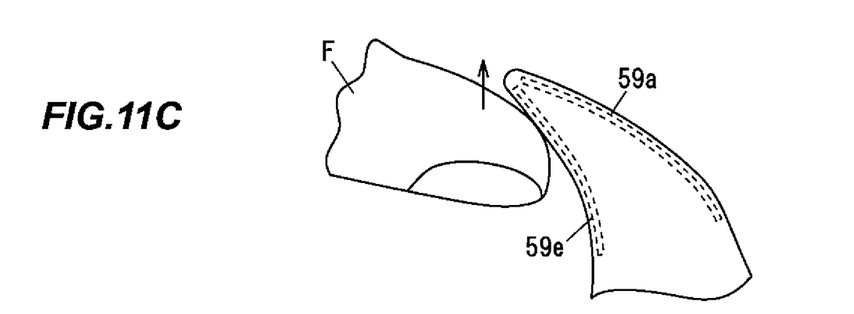
FIG. 11C is an explanatory diagram illustrating a pulling-up operation of a switch knob.

As illustrated in FIG. 11C, in a case of the pulling-up operation at a right region of the front switch knob 52, while the lower right strain sensor 59e is greatly curved and deformed, an amount of strain experienced by the upper right strain sensor 59a is less than an amount of strain experienced by the lower right strain sensor 59e.

In a case of the pushing-down operation or the pulling-up operation at a left region of the front switch knob 52, a relationship between the amounts of strain experienced by the upper left strain sensor 59c and the lower left strain sensor 59g is the same as a relationship between the amounts of strain experienced by the upper right strain sensor 59a and the lower right strain sensor 59e.

The strain sensors 59a, 59c, 59e, 59g of the front switch knob 52 detect an amount of strain caused in a case of the pushing-down operation or the pulling-up operation of the front switch knob 52 with a finger F. A signal indicating the amount of strain is transmitted to the controller 81. The controller 81 calculates an operation position on the front switch knob 52 and an operation direction to the front switch knob 52, an opening-closing direction of the window glass corresponding to a right-left operation position of the front switch knob 52, and the like on the basis of a difference in the amounts of strain experienced by the strain sensors 59a, 59c, 59e, 59g.

The storage unit of the controller 81 stores various setting data. These setting data is for determining a state that the operation position on an upper right portion and the operation direction to the upper right portion, the operation position on an upper left portion and the operation direction to the upper left portion, the operation position on a lower right portion and the operation direction to the lower right portion, and the operation position on a lower left portion and the operation direction to the lower left portion, of the front switch knob 52 operated with a finger F, a difference in the amounts of strain experienced by the four strain sensors 59a, 59c, 59e, 59g, an opening and closing direction of the window glass corresponding to a right-left operation position of the front switch knob 52, and the like are combined and associated with each other.

While referring to the table stored in the storage unit, the controller 81 determines the right-left operation position on the front switch knob 52, the operation direction to the front switch knob 52, the opening and closing direction of the window glass corresponding to the right-left operation position of the front switch knob 52 on the basis of a difference in the amounts of strain experienced by the four strain sensors 59a, 59c, 59e, 59g. The controller 81 recognizes an operation state of the operation switch 51 on the basis of the information acquired from the table stored in the storage unit to generate a window regulator drive signal indicating the operation state.

Also in the rear switch knob 53, the controller 81 can determine a right-left operation position on the rear switch knob 53, an operation direction to the rear switch knob 53, an opening and closing direction of a window glass corresponding to the right-left operation position on the rear switch knob 53, and the like on the basis of a difference in the amounts of strain experienced by four strain sensors including an upper right strain sensor 59b, an upper left strain sensor 59d, a lower right strain sensor 59f, and a lower left strain sensor 59h.

Effects of the Third Embodiment

The switch device 5 according to the third embodiment can provide the following effect in addition to the same effect as that of each of the embodiments described above.

A function of each of strain sensors 59a, 59b, 59c, 59d, 59e, 59f, 59g, 59h allows control of a raising and lowering operation of a window glass corresponding to each of the pair of vehicle front-back switch knobs 52, 53 without using a touch sensor. This configuration allows the operation switch 51 to be further simplified, which can achieve a reduced part cost.

Fourth Embodiment

Figure 12:
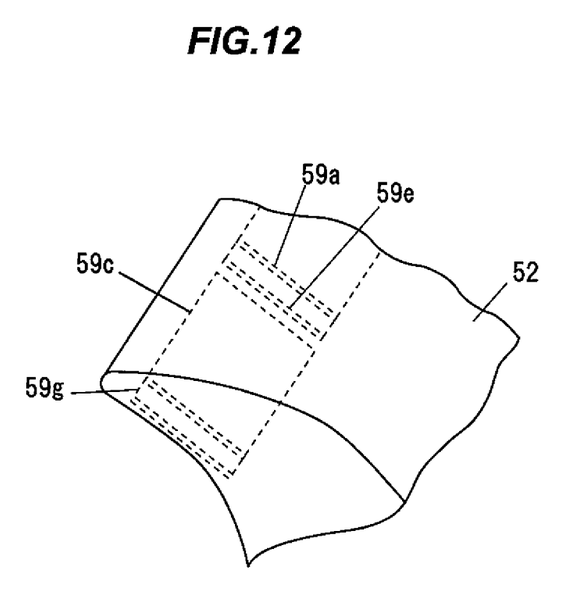
FIG. 12 is a perspective view schematically illustrating an example of a switch knob applicable to a switch device according to a fourth embodiment.

In FIG. 12, an example of a configuration of an operation switch 51 of a switch device 5 according to the fourth embodiment is schematically illustrated.

The operation switch 51 according to the fourth embodiment has substantially the same configuration as that of the operation switch 51 according to the third embodiment aside from the configuration of each of the strain sensors 59a, 59b, 59c, 59d, 59e, 59f, 59g, 59h. Thus, a configuration of the front switch knob 52 is mainly described, and detailed descriptions of the other members are omitted.

In the third embodiment described above, since the controller 81 determines an operation position on the switch knob 52, an operation direction to the switch knob 52, and the like on the basis of a difference in the amount of strain given depending on a curved state of each of the strain sensors 59a, 59c, 59e, 59g, each of the strain sensors 59a, 59c, 59e, 59g is preferably embedded in the front switch knob 52 with a curved surface having the same curvature.

In an embodiment in which the strain sensors 59a, 59c, 59e, 59g are embedded in the switch knob 52 and have a curved surface with different curvatures, as illustrated in FIG. 11B, while the upper right strain sensor 59a is greatly curved and deformed in the pushing-down operation at the right region of the front switch knob 52, the amount of strain experienced by the lower right strain sensor 59e is not necessarily less than the amount of strain experienced by the upper right strain sensor 59a.

In the fourth embodiment illustrated in FIG. 12, to precisely measure the amount of strain, plate-shaped strain sensors 59a, 59c, 59e, 59g are provided in the front switch knob 52 such that the strain sensor 59a and the strain sensor 59e face each other substantially in parallel, and the strain sensor 59c and the strain sensor 59g face each other substantially in parallel.

This configuration allows the strain sensor 59a and the strain sensor 59e or the strain sensor 59c and the strain sensor 59g to precisely receive force applied in the pushing-down operation or the pulling-up operation of the front switch knob 52 with the finger F to be curved.

Effects of the Fourth Embodiment

The switch device 5 according to the fourth embodiment can provide the following effect in addition to the same effect as that of each of the embodiments described above.

Since the plate-shaped strain sensors 59a, 59c, 59e, 59g are provided in the front switch knob 52 such that the strain sensor 59a and the strain sensor 59e are in parallel, and the strain sensor 59c and the strain sensor 59g in parallel, the switch device 5 can precisely detect the degree of curvature produced in the pushing-down operation or the pulling-up operation of the front switch knob 52 with the finger F, which can precisely control the raising and lowering operation of the window glass corresponding to the front switch knob 52.

Modified Examples

The switch device 5 of the invention is described on the basis of the embodiments, the modified examples, and the illustrated examples described above; however, the invention is not limited to the embodiments, the modified examples, and the illustrated examples described above, and can be implemented in various aspects without departing from the gist thereof. In each embodiment described above, the modified examples described below are possible, for example.

The attachment target to which the operation switch 51 is attached is not limited to the switch case 6 mounted within the upper surface of the door armrest 4. The attachment target to which the operation switch 51 is attached can employ a configuration in which the operation switch 51 is directly attached in an opening formed in an inner trim part of the door armrest 4 or an opening formed in another inner trim part such as a door trim, for example.

The number, position, pattern, or the like of arranged switch knobs 52, 53 is appropriately selected depending on the intended use. The operation switch 51 of each of the embodiments described above includes a driver seat switch for four seats; however, the above configuration is applicable to a switch for one seat.

It goes without saying that the operation switch 51 may be effectively employed in a switch device other than a switch device of the power window device.

A location in which the switch device 5 is disposed is not limited to a specific location, and the switch device 5 can be mounted in various interior components such as an instrument panel on a door other than the driver side door 1, a center console between a driver seat and a passenger seat, and each door armrest of a front passenger side door, a right rear side door, and a left rear side door.

As is clear from the above description, it should be understood that all combinations of the features described in the embodiments, the modified examples, and the illustrated examples are not required parts of the means to solve the problems of the invention.

REFERENCE SIGNS LIST

1 Driver side door
5, 100 Switch device
51 Operation switch
52, 53, 101, 102 Switch knob
54, 57A, 104 Recess
56a, 56b, 56c, 56d Touch sensor
59a, 59b Strain sensor

The invention claimed is:

1. A switch device comprising an operation switch comprising a switch knob formed integrally with a curved recess configured to allow a finger to be inserted,
   wherein the operation switch comprises a detector configured to detect a change in a physical amount caused by operation of the switch knob,
   wherein the detector comprises a touch sensor configured to detect contact between the switch knob and the finger, and
   wherein an end of the switch knob includes the curved recess for receiving the finger to perform a pulling-up operation or a pushing-down operation of the switch knob in a vehicle up-down direction.

2. The switch device according to claim 1, wherein the detector comprises a strain sensor configured to detect an amount of strain caused by a pulling-up force and a pushing-down force on the switch knob.

3. The switch device according to claim 1, wherein the operation switch is configured movable in a pulling-up direction and a pushing-down direction of the switch knob with respect to an attachment target to which the operation switch is attached, and
   wherein the detector includes a movement direction detection sensor configured to detect a movement direction with respect to the attachment target.

4. The switch device according to claim 1, wherein the operation switch comprises a plurality of switch knobs, and
   wherein the plurality of switch knobs are formed integrally with each other at required intervals.

5. The switch device according to claim 1, wherein the operation switch comprises an operation switch installed in a vehicle cabin of a vehicle.

6. The switch device according to claim 1, wherein the operation switch comprises an operation switch installed in a door on a vehicle cabin side of a vehicle.

7. The switch device according to claim 1, wherein the switch knob integrates with a main body of the operation switch and does not comprise a moving part.

8. The switch device according to claim 1, wherein the curved recess of the switch knob has a taper-shaped leading end portion having a lower surface that receives the finger to perform a pulling-up operation.

* * * * *